(12) United States Patent
Kuroda et al.

(10) Patent No.: US 12,397,830 B2
(45) Date of Patent: Aug. 26, 2025

(54) VEHICLE CONTROLLER, METHOD, AND COMPUTER PROGRAM FOR VEHICLE CONTROL

(71) Applicant: TOYOTA JIDOSHA KABUSHIKI KAISHA, Toyota (JP)

(72) Inventors: Ryusuke Kuroda, Tokyo-to (JP); Takuya Fujiki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 151 days.

(21) Appl. No.: 18/449,151

(22) Filed: Aug. 14, 2023

(65) Prior Publication Data
US 2024/0075962 A1   Mar. 7, 2024

(30) Foreign Application Priority Data

Aug. 25, 2022   (JP) .................................. 2022-134382

(51) Int. Cl.
*B60W 60/00*    (2020.01)
*B60W 40/08*    (2012.01)

(52) U.S. Cl.
CPC ........ *B60W 60/0051* (2020.02); *B60W 40/08* (2013.01)

(58) Field of Classification Search
CPC ............. B60W 60/0051; B60W 40/08; B60W 2420/403; B60W 2510/30; B60W 2554/406; B60W 2556/40; B60W 2556/50; B60W 2555/20; B60W 2556/45; B60W 60/0059; B60W 50/00; B60W 60/005; B60W 2050/0095; B60R 16/0231
See application file for complete search history.

(56) References Cited

U.S. PATENT DOCUMENTS

| | | | |
|---|---|---|---|
| 2016/0282865 A1 | 9/2016 | Shimizu et al. | |
| 2018/0339645 A1* | 11/2018 | Ekkizogloy | B60Q 1/08 |
| 2020/0086790 A1* | 3/2020 | Gallagher | H04W 4/44 |
| 2020/0319636 A1 | 10/2020 | Urano et al. | |
| 2021/0178959 A1 | 6/2021 | Ishida | |
| 2022/0242447 A1* | 8/2022 | Nagura | B60W 60/005 |

(Continued)

FOREIGN PATENT DOCUMENTS

| | | | | |
|---|---|---|---|---|
| CN | 117261740 A * | 6/2022 | | B60Q 1/14 |
| DE | 102019134840 A1 * | 6/2021 | | B60R 16/02 |

(Continued)

*Primary Examiner* — Ramya P Burgess
*Assistant Examiner* — Brittany Renee Peko
(74) *Attorney, Agent, or Firm* — Dickinson Wright, PLLC

(57) ABSTRACT

A vehicle controller includes a processor configured to determine whether a vehicle under manual driving control is in a situation that allows for starting autonomous driving control of the vehicle, switch, when the vehicle is in a situation that allows for starting autonomous driving control, control of the vehicle from manual driving control to autonomous driving control in the case where operating mode of a device related to ensuring visibility of a driver of the vehicle is set to automatic mode to automatically control the device, and continue manual driving control in the case where the operating mode of the device related to ensuring the driver's visibility is set to manual mode to manually control the device and where the driver's visibility will not be ensured unless the device operates.

6 Claims, 5 Drawing Sheets

(56) References Cited

U.S. PATENT DOCUMENTS

2023/0234600 A1\* 7/2023 Craigen ................ B60W 50/14
2024/0157964 A1\* 5/2024 Kume ................ B60W 60/001

FOREIGN PATENT DOCUMENTS

| | | |
|---|---|---|
| EP | 3838699 A1 | 6/2021 |
| JP | 2016179767 A | 10/2016 |
| JP | 2017210019 A | 11/2017 |
| JP | 2019014408 A | 1/2019 |
| JP | 2020175884 A | 10/2020 |
| WO | 2014085380 A1 | 6/2014 |
| WO | 2019082980 A1 | 5/2019 |

\* cited by examiner

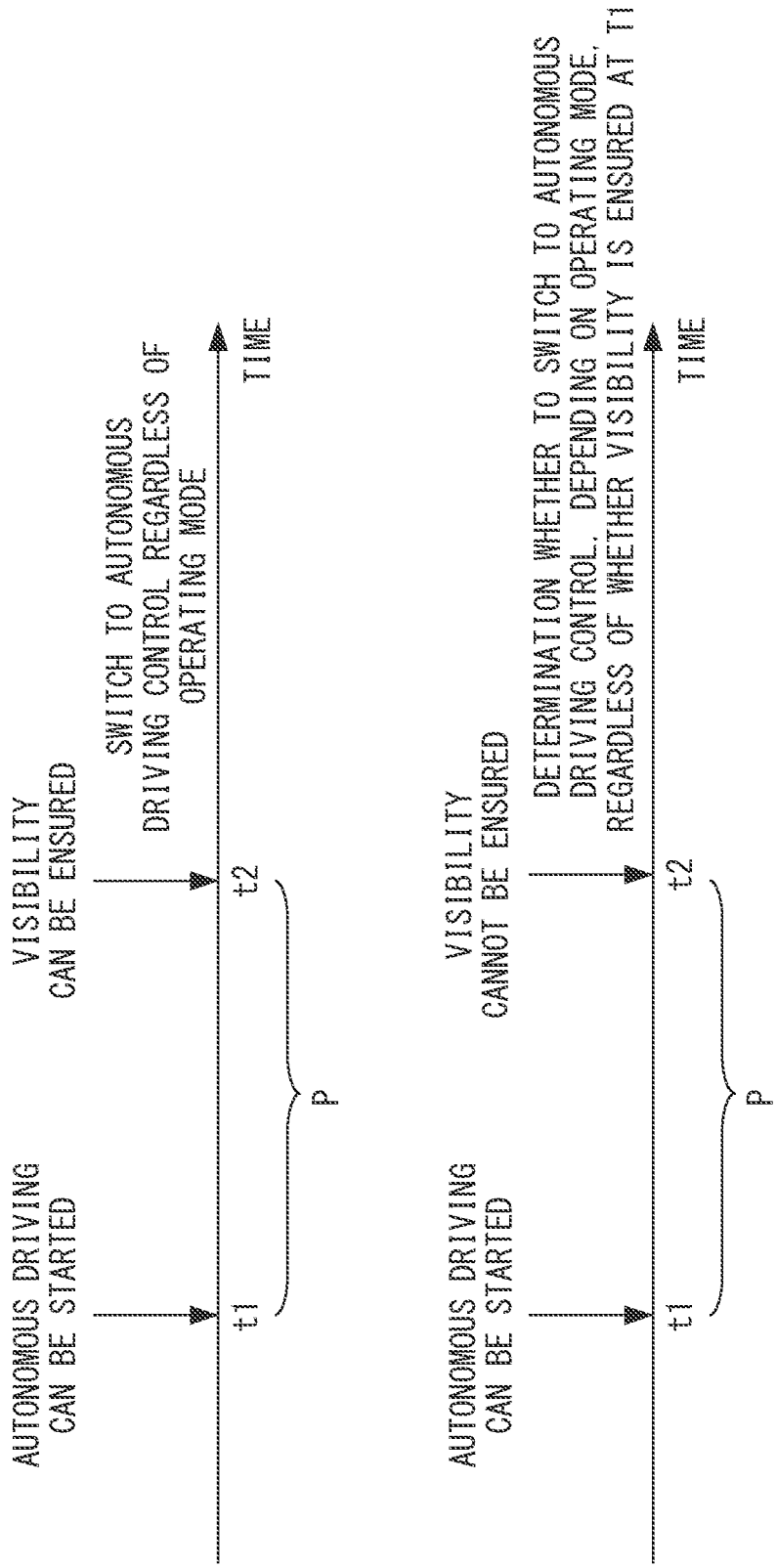

VEHICLE CONTROLLER, METHOD, AND COMPUTER PROGRAM FOR VEHICLE CONTROL

FIELD

The present invention relates to a vehicle controller, a method, and a computer program for vehicle control.

BACKGROUND

Control of a vehicle to which autonomous driving control is applicable may be transferred from an electronic control unit mounted on the vehicle to a driver in some cases. To enable a driver to take over driving control of a vehicle appropriately in such cases, techniques to control a vehicle-mounted device so as to ensure the driver's visibility at transferring control have been proposed (e.g., see Japanese Unexamined Patent Publications JP2016-179767A and JP2020-175884A).

A controller for a vehicle disclosed in JP2016-179767A operates a defogging unit that prevents windows of the vehicle from fogging, when a driving control unit makes a switch from automatic driving to manual driving. The controller controls a removal unit that removes dirt of a detection unit that detects information on surroundings, when the driving control unit makes a switch from manual driving to automatic driving.

A method for controlling a driving condition component of an autonomous vehicle disclosed in JP2020-175884A includes determining whether current conditions would limit a driver's visibility, and predicting whether the driver will enable a manual mode during the current conditions. The method further includes controlling the driving condition component to mitigate the current conditions prior to the driver enabling the manual mode.

SUMMARY

In the above-described techniques, the controller automatically operates a vehicle-mounted device during autonomous driving control of the vehicle so that the driver's visibility will be ensured when control is transferred to the driver. However, in some cases, the operating mode of a windshield wiper may be set to manual mode for the driver to manually control the wiper, and operation of the windshield wiper may be stopped. In such cases, even if it becomes difficult to ensure the driver's visibility during autonomous driving control of the vehicle, the controller may fail to operate the vehicle-mounted device to ensure the driver's visibility, depending on the situation around the vehicle.

It is an object of the present invention to provide a vehicle controller that can prevent the occurrence of a situation where the driver's visibility is not ensured, even if the need to transfer control to the driver arises during autonomous driving control of the vehicle.

According to an embodiment, a vehicle controller is provided. The vehicle controller includes a processor configured to: determine whether a vehicle under manual driving control is in a situation that allows for starting autonomous driving control of the vehicle, switch, when the vehicle is in a situation that allows for starting autonomous driving control, control of the vehicle from manual driving control to autonomous driving control in the case where operating mode of a device related to ensuring visibility of a driver of the vehicle is set to automatic mode to automatically control the device, and continue control of the vehicle that remains manual driving control in the case where the operating mode of the device related to ensuring the driver's visibility is set to manual mode to manually control the device and where the driver's visibility will not be ensured unless the device operates.

In the vehicle controller, the processor is preferably further configured to predict a period during which autonomous driving control is applicable for the case where control of the vehicle is switched from manual driving control to autonomous driving control, determine whether a situation where visibility of the driver of the vehicle is not ensured will occur at the end of the period, and switch, when the situation does not occur, control of the vehicle from manual driving control to autonomous driving control even if the operating mode of the device related to ensuring the driver's visibility is set to the manual mode at the time when the vehicle is in a situation that allows for starting autonomous driving control of the vehicle.

In the case where the situation where visibility of the driver of the vehicle is not ensured will occur at the end of the period during which autonomous driving control is applicable, even if visibility of the driver of the vehicle is ensured at the time when the vehicle is in a situation that allows for starting autonomous driving control of the vehicle, the processor preferably continues control of the vehicle that remains manual driving control in the case where the operating mode of the device related to ensuring the driver's visibility is set to the manual mode to manually control the device and where the driver's visibility will not be ensured unless the device operates.

In the vehicle controller, the device related to ensuring the driver's visibility is preferably a windshield wiper; and the processor preferably determines that the driver's visibility will not be ensured unless the device operates, when rainfall measured by a rainfall sensor provided on the vehicle is not less than a predetermined threshold or when the current position of the vehicle is within a rainy region indicated by weather information received from another device.

Alternatively, the device related to ensuring the driver's visibility is preferably a headlight; and the processor preferably determines that the driver's visibility will not be ensured unless the device operates, when illuminance measured by an illuminance sensor provided on the vehicle is not greater than a predetermined threshold or when the current time is after sunset and before sunrise.

Alternatively, the device related to ensuring the driver's visibility is preferably an air conditioner; and the processor preferably determines that the driver's visibility will not be ensured unless the device operates, when humidity in the interior of the vehicle measured by a humidity sensor provided on the vehicle is not less than a predetermined threshold.

According to another embodiment, a method for vehicle control is provided. The method includes determining whether a vehicle under manual driving control is in a situation that allows for starting autonomous driving control of the vehicle; switching, when the vehicle is in a situation that allows for starting autonomous driving control, control of the vehicle from manual driving control to autonomous driving control in the case where operating mode of a device related to ensuring visibility of a driver of the vehicle is set to automatic mode to automatically control the device; and continuing control of the vehicle that remains manual driving control in the case where the operating mode of the device related to ensuring the driver's visibility is set to manual mode to manually control the device and where the driver's visibility will not be ensured unless the device operates.

According to still another embodiment, a non-transitory recording medium that stores a computer program for vehicle control is provided. The computer program includes instructions causing a processor mounted on a vehicle to execute a process including determining whether the vehicle under manual driving control is in a situation that allows for starting autonomous driving control of the vehicle; switching, when the vehicle is in a situation that allows for starting autonomous driving control, control of the vehicle from manual driving control to autonomous driving control in the case where operating mode of a device related to ensuring visibility of a driver of the vehicle is set to automatic mode to automatically control the device; and continuing control of the vehicle that remains manual driving control in the case where the operating mode of the device related to ensuring the driver's visibility is set to manual mode to manually control the device and where the driver's visibility will not be ensured unless the device operates.

The vehicle controller according to the present disclosure has an advantageous effect of being able to prevent the occurrence of a situation where the driver's visibility is not ensured, even if the need to transfer control to the driver arises during autonomous driving control of the vehicle.

BRIEF DESCRIPTION OF DRAWINGS

FIG. 5 illustrates examples of transition determination according to a modified example.

DESCRIPTION OF EMBODIMENTS

A vehicle controller, a method for vehicle control executed by the vehicle controller, and a computer program for vehicle control will now be described with reference to the attached drawings. The vehicle controller can execute autonomous driving control of a vehicle in predetermined situations, and determines whether the vehicle under manual driving control is in a predetermined situation that allows for starting autonomous driving control of the vehicle. When the vehicle is in the predetermined situation, the vehicle controller switches control of the vehicle from manual driving control to autonomous driving control in the case where operating mode of a device related to ensuring visibility of a driver of the vehicle is set to automatic mode to automatically control the device. The vehicle controller continues control of the vehicle that remains manual driving control in the case where the operating mode of the device related to ensuring the driver's visibility is set to manual mode to manually control the device and where the driver's visibility will not be ensured unless the device operates.

Figure 1:
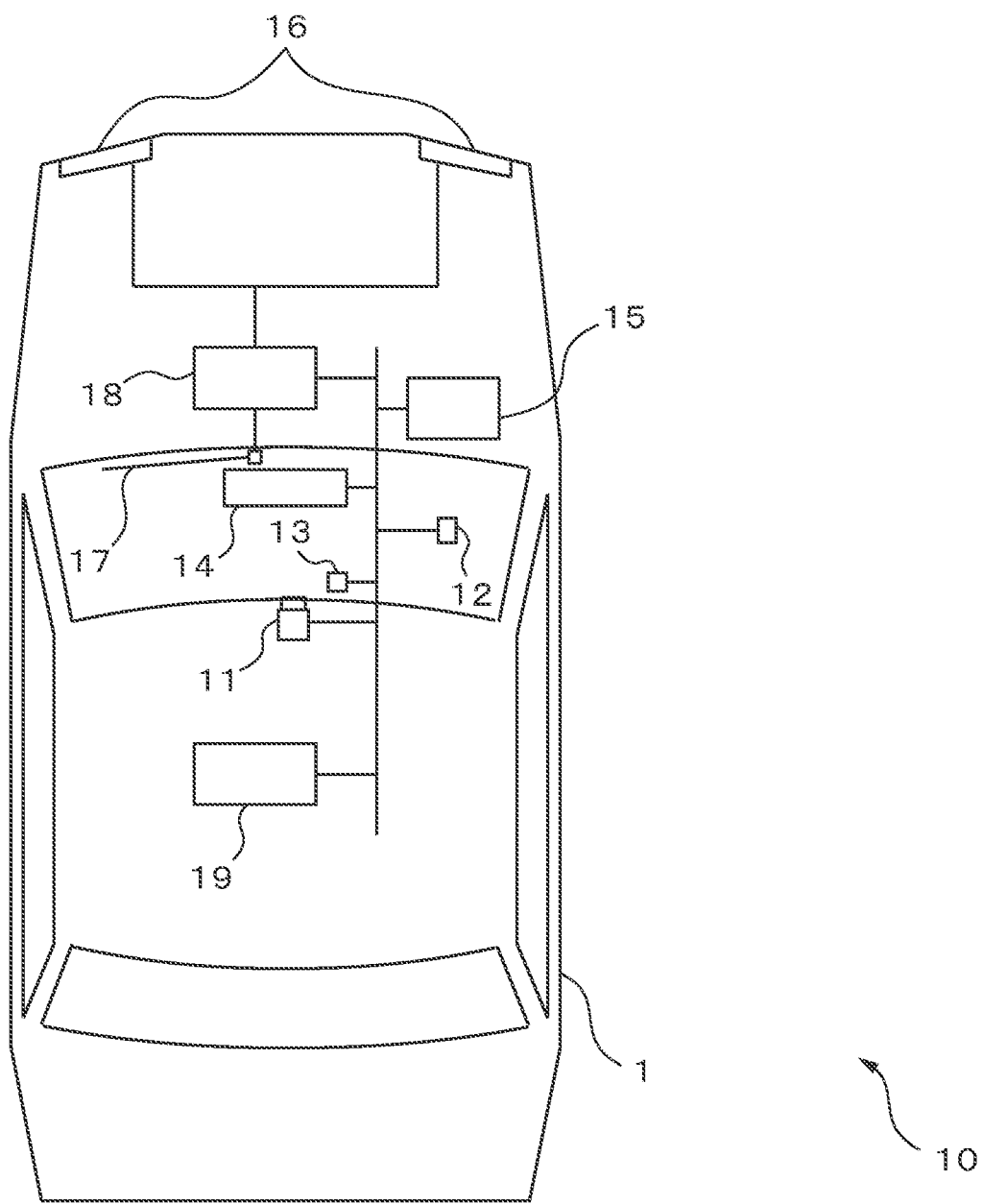
FIG. 1 schematically illustrates the configuration of a vehicle control system including a vehicle controller.

FIG. 1 schematically illustrates the configuration of a vehicle control system including the vehicle controller. The vehicle control system 10 mounted on a vehicle 1 includes a vehicle exterior sensor 11, an illuminance sensor 12, a rainfall sensor 13, a notification device 14, and an electronic control unit (ECU) 15, which is an example of the vehicle controller. The vehicle exterior sensor 11, the illuminance sensor 12, the rainfall sensor 13, and the notification device 14 are communicably connected to the ECU 15 via an in-vehicle network conforming to a communication standard, such as a controller area network. In addition, the ECU 15 is connected via the in-vehicle network to an electronic control unit (BODY-ECU) 18 for controlling headlights 16 and a windshield wiper 17 and to an air conditioner 19 for adjusting the temperature and humidity in the interior of the vehicle 1. The headlights 16, the windshield wiper 17, and the air conditioner 19 are examples of the device related to ensuring the driver's visibility. The vehicle control system 10 may further include a navigation device (not illustrated), a wireless communication device (not illustrated), and a receiver (not illustrated) that receives signals from a satellite positioning system to determine the position of the vehicle 1, such as a GPS receiver.

The vehicle exterior sensor 11 generates exterior sensor signals representing the surroundings of the vehicle 1 at predetermined intervals. For example, the vehicle exterior sensor 11 may be a camera provided in the interior of the vehicle 1 so as to take pictures of a predetermined region outside the vehicle 1 (e.g., a region in front of the vehicle 1). In this case, the exterior sensor signals are images representing the predetermined region. Alternatively, the vehicle exterior sensor 11 may be a range sensor that measures the distances to objects around the vehicle 1, such as LiDAR or radar. In this case, the exterior sensor signals are ranging signals indicating the distance to an object within a predetermined measurement area for each bearing. The vehicle 1 may include vehicle exterior sensors 11 of the same type, such as cameras or range sensors. In this case, the vehicle exterior sensors 11 are mounted so that their orientations, capture areas, or measurement areas differ from each other. Alternatively, the vehicle 1 may include vehicle exterior sensors 11 of different types, such as a combination of a camera and a range sensor.

Every time an exterior sensor signal is generated, the vehicle exterior sensor 11 outputs the generated exterior sensor signal to the ECU 15 via the in-vehicle network.

The illuminance sensor 12 is provided, for example, near the windshield in the interior of the vehicle 1, and measures brightness (illuminance) around the vehicle 1. The illuminance sensor 12 outputs illuminance signals indicating measured brightness to the ECU 15 via the in-vehicle network at predetermined intervals.

The rainfall sensor 13 is provided, for example, on the windshield of the vehicle 1, and measures rainfall around the vehicle 1. The rainfall sensor 13 outputs rainfall signals indicating measured rainfall to the ECU 15 via the in-vehicle network at predetermined intervals.

The illuminance sensor 12 and the rainfall sensor 13 may be connected to the BODY-ECU 18. In this case, the ECU 15 obtains illuminance signals and rainfall signals via the BODY-ECU 18.

The notification device 14 is provided in the interior of the vehicle 1, and makes predetermined notification to the driver with light, voice, or displayed text or images. To achieve this, the notification device 14 includes, for example, at least one of a speaker, a light source, or a display. When notification to the driver is received from the ECU 15, the notification device 14 informs the driver of the notification by outputting a voice from the speaker, lighting up or blinking the light source, or displaying the notification on the display.

The ECU 15 can execute autonomous driving control of the vehicle 1 when the vehicle 1 is in a predetermined situation. Thus, when the vehicle 1 is under manual driving control by the driver, the ECU 15 determines whether the vehicle 1 is in a predetermined situation. When the vehicle 1 is in a predetermined situation that allows for starting autonomous driving control, the ECU 15 determines whether the operating mode of a device related to ensuring visibility of the driver of the vehicle is set to automatic mode, and determines whether to make a switch to autonomous driving control, depending on the result of determination.

Figure 2:
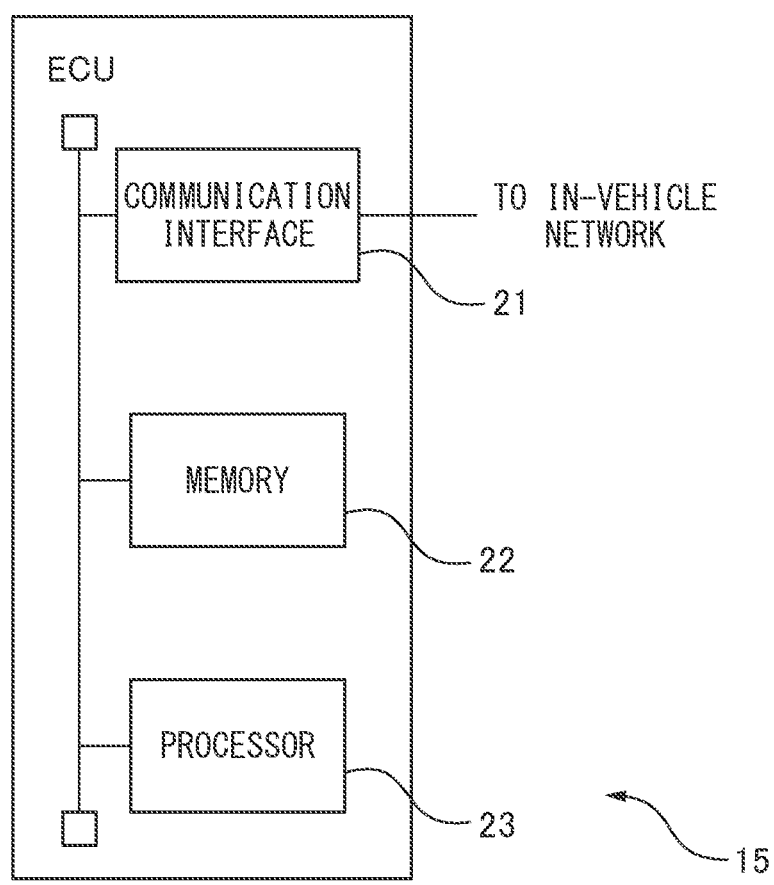
FIG. 2 illustrates the hardware configuration of an ECU, which is an example of the vehicle controller.

FIG. 2 illustrates the hardware configuration of the ECU 15. As illustrated in FIG. 2, the ECU 15 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 15 to the in-vehicle network. Every time an exterior sensor signal is received from the vehicle exterior sensor 11, the communication interface 21 passes the exterior sensor signal to the processor 23. Similarly, every time an illuminance signal is received from the illuminance sensor 12, the communication interface 21 passes the illuminance signal to the processor 23; every time a rainfall signal is received from the rainfall sensor 13, the communication interface 21 passes the rainfall signal to the processor 23. When a signal indicating the operating mode of the headlights 16 or the windshield wiper 17 is received from the BODY-ECU 18, the communication interface 21 passes the signal to the processor 23. In addition, when a signal indicating operating mode is received from the air conditioner 19, the communication interface 21 passes the signal to the processor 23. Further, when traffic information or weather information is received from another device (e.g., a server for managing traffic conditions or a server for announcing weather information) via a wireless communication device (not illustrated), the communication interface 21 passes the traffic information or the weather information to the processor 23. Further, when notification to the driver is received from the processor 23, the communication interface 21 outputs the notification to the notification device 14.

The memory 22, which is an example of a storage unit, includes, for example, volatile and nonvolatile semiconductor memories, and stores various algorithms and various types of data used in a vehicle control process executed by the processor 23 of the ECU 15. For example, the memory 22 stores internal parameters indicating the mounted position and the measurement area of the vehicle exterior sensor 11, various parameters used for determining the situation around the vehicle, and messages to be notified to the driver. The memory 22 may further store a high-precision map including information such as the positions and shapes of road sections included in a predetermined region as well as road markings, traffic signs, and regulation speeds of the road sections. The high-precision map is used for autonomous driving control of the vehicle 1. In addition, the memory 22 stores exterior sensor signals, illuminance signals, rainfall signals, traffic information, and weather information received in the most recent certain period as well as operating mode applied to the headlights 16, the windshield wiper 17, and the air conditioner 19. Further, the memory 22 temporarily stores a flag indicating the level of driving control applied to the vehicle 1 and various types of data generated during the vehicle control process. The exterior sensor signals, traffic information, and weather information are examples of situation information indicating the situation around the vehicle 1.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process.

Figure 3:
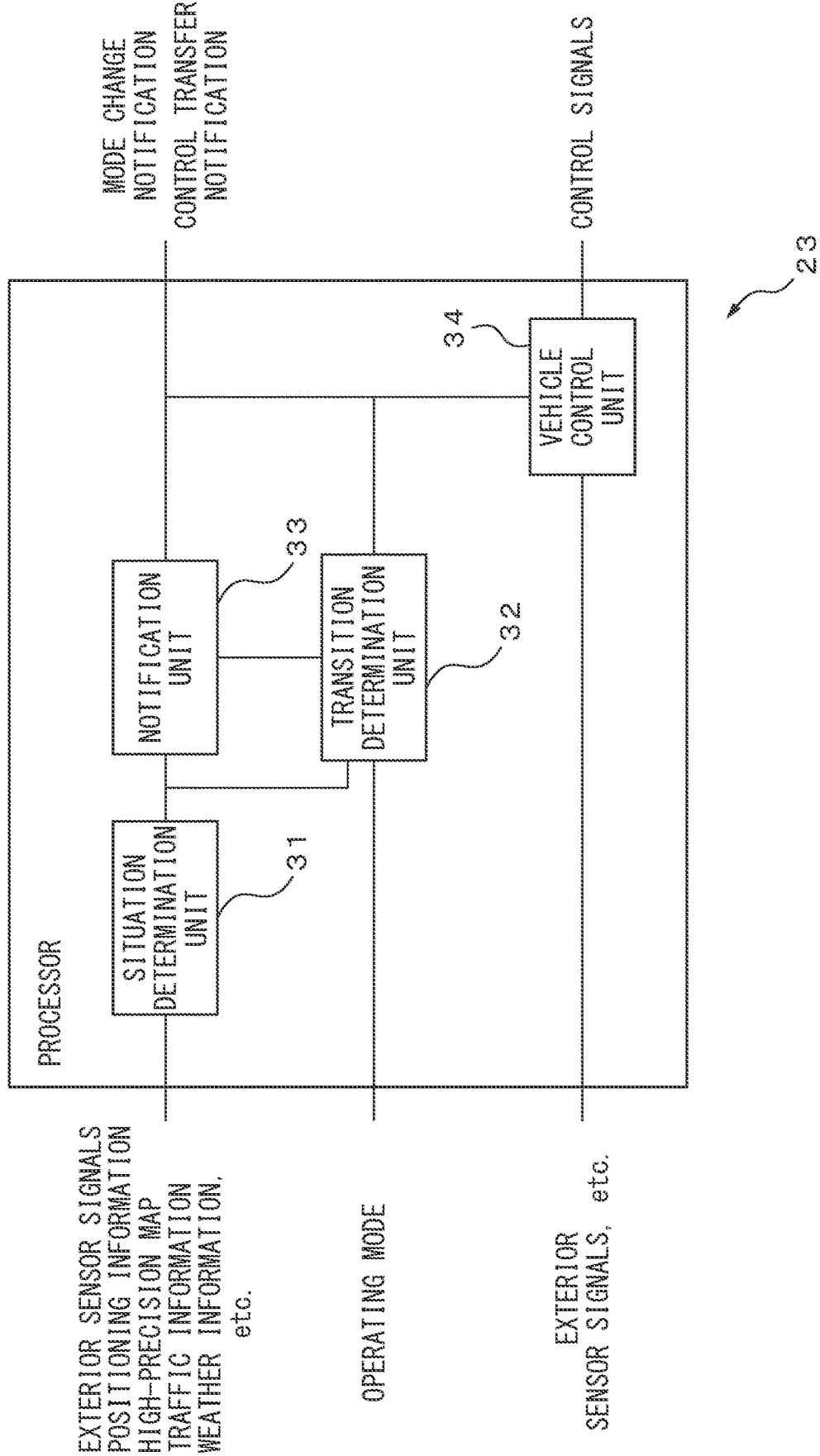
FIG. 3 is a functional block diagram of a processor of the ECU, related to a vehicle control process.

FIG. 3 is a functional block diagram of the processor 23, related to the vehicle control process. The processor 23 includes a situation determination unit 31, a transition determination unit 32, a notification unit 33, and a vehicle control unit 34. These units included in the processor 23 are functional modules, for example, implemented by a computer program executed by the processor 23, or may be dedicated operating circuits provided separately in the processor 23.

The situation determination unit 31 determines whether the vehicle 1 is under manual driving control, by referring to the flag indicating the level of driving control applied to the vehicle 1. When the vehicle 1 is under manual driving control, the situation determination unit 31 determines whether the vehicle 1 is in a predetermined situation that allows for starting autonomous driving control of the vehicle 1.

In the present embodiment, assume that the predetermined situation that allows for starting autonomous driving control of the vehicle 1 is a situation where traffic around the vehicle 1 is congested. Thus the situation determination unit 31 determines whether traffic around the vehicle 1 is congested, based on situation information, and determines that autonomous driving control of the vehicle 1 can be started, when traffic around the vehicle 1 is congested.

For example, the situation determination unit 31 detects other vehicles traveling around the vehicle 1, based on time-series exterior sensor signals obtained in the most recent predetermined period, and tracks the detected vehicles. When the speed of the tracked vehicles relative to the vehicle 1 estimated on the basis of the result of tracking satisfies a predetermined congestion condition, the situation determination unit 31 determines that traffic around the vehicle 1 is congested. In this case, the situation determination unit 31 detects other vehicles around the vehicle 1 by inputting an exterior sensor signal into a classifier that has been trained to detect another vehicle traveling around the vehicle 1 from an exterior sensor signal. As such a classifier, the situation determination unit 31 can use, for example, a "deep neural network" (hereafter simply a "DNN") having architecture of a convolutional neural network (hereafter simply "CNN") type. Such a classifier is trained in advance in accordance with a training technique, such as backpropagation, with a large number of training images representing vehicles to be detected.

The situation determination unit 31 executes a predetermined tracking process, such as the KLT algorithm, on the vehicles detected from each of the time-series exterior sensor signals to associate regions representing the same vehicle in the respective exterior sensor signals (hereafter "object regions") with each other. In addition, the situation determination unit 31 estimates the positions of the vehicles being tracked relative to the vehicle 1 at the time of acquisition of each exterior sensor signal. In the case where the vehicle exterior sensor 11 includes a camera and where the exterior sensor signals are images obtained by the camera, the bottom of an object region representing a vehicle is assumed to correspond to a position at which the vehicle touches the road surface. Thus the situation determination unit 31 can estimate the distance from the vehicle 1 to another vehicle at the time of acquisition of each image, based on the bearing from the camera corresponding to the bottom of the object region representing the other vehicle in each image and the height of the camera from the road surface, which is one of the internal parameters of the camera. In addition, the position of an object region in an image (e.g., the centroid of an object region) corresponds one-to-one to the direction of the other vehicle included in the object region viewed from the camera. Thus the situation determination unit 31 can estimate the bearing of a vehicle being tracked relative to the vehicle 1, based on the position of the object region in each image. The situation determination unit 31 can then estimate the position of the vehicle being tracked relative to the vehicle 1, based on the estimated distance and bearing to the tracked vehicle at the time of acquisition of each image.

In the case where the vehicle exterior sensor 11 includes a range sensor and where the exterior sensor signals are ranging signals obtained by the range sensor, the bearing corresponding to the centroid of an object region in each ranging signal and the distance value in this bearing correspond to the bearing and distance to a vehicle being tracked relative to the vehicle 1. Thus the situation determination unit 31 can estimate the position of the vehicle being tracked relative to the vehicle 1, based on the bearing corresponding to the centroid of an object region in each ranging signal and the distance to the tracked vehicle in this bearing.

Based on the positions of the vehicles being tracked relative to the vehicle 1, the situation determination unit 31 selects a vehicle traveling ahead of the vehicle 1 among the vehicles being tracked. When there are multiple vehicles ahead, the situation determination unit 31 may select the vehicle closest to the vehicle 1 among the vehicles ahead. The situation determination unit 31 then calculates changes in the speed of the selected vehicle ahead relative to the vehicle 1 and changes in the distance between the selected vehicle ahead and the vehicle 1 in the most recent predetermined period (e.g., 3 to 5 seconds), based on changes in the relative position of the selected vehicle ahead in the most recent predetermined period.

The situation determination unit 31 determines that traffic around the vehicle 1 is congested, when the absolute value of the speed of the vehicle ahead relative to the vehicle 1 has not been greater than a predetermined relative-speed threshold (e.g., 1 m/s) and the distance between the vehicle 1 and the vehicle ahead has been within a predetermined distance range (e.g., not less than 3 m nor greater than 25 m) for the most recent predetermined period.

Alternatively, regarding every vehicle being tracked, the situation determination unit 31 may calculate changes in the speed of the tracked vehicle relative to the vehicle 1 in the most recent predetermined period. The situation determination unit 31 may determine that traffic around the vehicle 1 is congested, when the speed of every tracked vehicle relative to the vehicle 1 has not been greater than a predetermined relative-speed threshold (e.g., 3 m/s) for the most recent predetermined period.

The situation determination unit 31 may determine that traffic around the vehicle 1 is congested, when the speed of the vehicle 1 measured by a vehicle speed sensor (not illustrated) mounted on the vehicle 1 satisfies a predetermined congestion condition. For example, the situation determination unit 31 determines that traffic around the vehicle 1 is congested, when the speed of the vehicle 1 measured by the vehicle speed sensor has not been greater than a predetermined upper-limit congestion speed for the most recent certain period. The upper-limit congestion speed may be, for example, a predetermined offset value subtracted from the regulation speed of a road being traveled by the vehicle 1. The situation determination unit 31 identifies the road being traveled by the vehicle 1 and its regulation speed by referring to a high-precision map stored in the memory 22 and the current position of the vehicle 1 determined by a GPS receiver (not illustrated).

Alternatively, the situation determination unit 31 may determine that traffic around the vehicle 1 is congested, when the current position of the vehicle 1 determined by the GPS receiver (not illustrated) is within a congested section indicated by traffic information received via the wireless communication device (not illustrated).

Alternatively, the situation determination unit 31 may determine that traffic around the vehicle 1 is congested, only when it is determined so by two or more of the above-described techniques for determination of congestion.

When it is determined that traffic around the vehicle 1 is congested, the situation determination unit 31 notifies the transition determination unit 32 and the vehicle control unit 34 that autonomous driving control of the vehicle 1 can be started.

The predetermined situation that allows for starting autonomous driving control of the vehicle 1 is not limited to the one in the above-described example. For example, the predetermined situation that allows for starting autonomous driving control of the vehicle 1 may be a situation where the current position of the vehicle 1 is within a region covered by a high-precision map and where the road being traveled by the vehicle 1 is a road of a predetermined standard (e.g., an expressway). In this case, when the vehicle 1 is under manual driving control, the situation determination unit 31 refers to a high-precision map and the current position of the vehicle 1 determined by the GPS receiver (not illustrated), at predetermined intervals. When the current position of the vehicle 1 is within a region covered by the high-precision map and on a road of a predetermined standard, the situation determination unit 31 may determine that autonomous driving control of the vehicle 1 can be started, and notify the transition determination unit 32 and the vehicle control unit 34 of the result of determination.

In addition, when autonomous driving control is applied to the vehicle 1, the situation determination unit 31 determines whether the above-described predetermined condition for determining that autonomous driving control can be started is no longer satisfied. When the predetermined condition is no longer satisfied, the situation determination unit 31 notifies the notification unit 33 and the vehicle control unit 34 that autonomous driving control cannot continue. For example, when the condition for determining that traffic around the vehicle 1 is congested is no longer satisfied, the situation determination unit 31 determines that congestion around the vehicle 1 is relieved. The situation determination unit 31 then notifies the notification unit 33 and the vehicle control unit 34 that autonomous driving control cannot continue. Alternatively, when the distance along the travel direction of the vehicle 1 from the current position of the vehicle 1 to a location on an edge of a region covered by a high-precision map falls below a predetermined distance, the situation determination unit 31 notifies the notification unit 33 and the vehicle control unit 34 that autonomous driving control cannot continue.

When notified that the vehicle 1 is in a situation that allows for starting autonomous driving control of the vehicle 1, the transition determination unit 32 determines whether to transfer control of the vehicle 1 from the driver to the ECU 15, depending on the operating mode of a device related to ensuring the driver's visibility and whether the driver's visibility is ensured. For example, the transition determination unit 32 determines whether to transfer control of the vehicle 1 from the driver to the ECU 15, depending on the operating mode of the headlights 16 and the windshield wiper 17 and whether the driver's visibility is ensured.

In the present embodiment, the transition determination unit 32 determines to transfer control of the vehicle 1 from the driver to the ECU 15, when the operating mode of the headlights 16 and the windshield wiper 17 is automatic mode. In automatic mode of the headlights 16, lighting up or turning off is automatically controlled on the basis of an illuminance signal. In automatic mode of the windshield wiper 17, operation of the windshield wiper 17 is automatically controlled on the basis of a rainfall signal.

When at least the operating mode of the headlights 16 or the windshield wiper 17 is set to manual mode to manually control the device, the transition determination unit 32 determines whether the driver's visibility will not be ensured unless the device set to manual mode operates. When the driver's visibility will not be ensured unless the device set to manual mode operates, the transition determination unit 32 determines to continue driving control of the vehicle 1 that remains manual driving control, without transferring control of the vehicle 1 to the ECU 15.

For example, when illuminance around the vehicle 1 indicated by the latest illuminance signal is not greater than a predetermined illuminance threshold, the transition determination unit 32 determines that it is so dark around the vehicle 1 that the driver's visibility cannot be ensured unless the headlights 16 light up. Alternatively, the transition determination unit 32 determines whether the current time is within the period after sunset and before sunrise, based on the current time and date indicated by a timepiece (not illustrated) mounted on the vehicle 1 and the latitude and longitude of the current position of the vehicle determined by the GPS receiver (not illustrated). When the current time is within the period after sunset and before sunrise, the transition determination unit 32 may determine that it is so dark around the vehicle 1 that the driver's visibility cannot be ensured unless the headlights 16 light up. In such a case, even if control of the vehicle 1 is transferred to the ECU 15 to start autonomous driving control, it may be too dark around the vehicle 1 to ensure the driver's visibility when it becomes impossible to continue autonomous driving control thereafter. Thus the transition determination unit 32 does not transfer control of the vehicle 1 to the ECU 15.

When rainfall indicated by the latest rainfall signal is not less than a predetermined rainfall threshold, the transition determination unit 32 determines that the driver's visibility will not be ensured unless the windshield wiper 17 operates. Alternatively, when the current position of the vehicle determined by the GPS receiver (not illustrated) is within a rainy region indicated by weather information received via the wireless communication device (not illustrated), the transition determination unit 32 may determine that the driver's visibility will not be ensured unless the windshield wiper 17 operates. In such a case, even if control of the vehicle 1 is transferred to the ECU 15 to start autonomous driving control, the driver's visibility may not be ensured because of rain when it becomes impossible to continue autonomous driving control thereafter. Thus the transition determination unit 32 does not transfer control of the vehicle 1 to the ECU 15.

Even if the operating mode of the headlights 16 is set to manual mode, it may be so bright around the vehicle 1 that the driver's visibility can be ensured with the headlights 16 turned off in some cases, e.g., when illuminance is higher than the illuminance threshold. In such cases, the transition determination unit 32 may transfer control of the vehicle 1 to the ECU 15. Similarly, even if the operating mode of the windshield wiper 17 is set to manual mode, the transition determination unit 32 may transfer control of the vehicle 1 to the ECU 15 when the driver's visibility is ensured without operation of the windshield wiper 17, e.g., when rainfall is less than the rainfall threshold. In addition, when the headlights 16 are manually controlled to light up, the transition determination unit 32 may transfer control of the vehicle 1 to the ECU 15 even if the operating mode of the headlights 16 is set to manual mode, because the driver's visibility will be ensured at finishing autonomous driving control. Similarly, when the windshield wiper 17 is manually controlled to operate, the transition determination unit 32 may transfer control of the vehicle 1 to the ECU 15 even if the operating mode of the windshield wiper 17 is set to manual mode, because the driver's visibility will be ensured at finishing autonomous driving control.

In addition, the transition determination unit 32 may determine whether to transfer control of the vehicle 1 from the driver to the ECU 15, by referring to the operating mode of the air conditioner 19. For example, when the humidity in the interior of the vehicle 1 measured by a humidity sensor (not illustrated) provided in the vehicle interior is not less than a fogginess determination threshold, the transition determination unit 32 determines that the driver's visibility will not be ensured unless the air conditioner 19 executes defogging operation. In such a case, even if control of the vehicle 1 is transferred to the ECU 15 to start autonomous driving control, the driver's visibility may not be ensured because of fogginess of the windshield when it becomes impossible to continue autonomous driving control thereafter. Thus, in the case where the operating mode of the air conditioner 19 is set to manual mode and where the humidity in the vehicle interior is not less than the fogginess determination threshold, the transition determination unit 32 may determine to continue driving control of the vehicle 1 that remains manual driving control, without transferring control of the vehicle 1 to the ECU 15. In the case where the operating mode of the air conditioner 19 is set to automatic mode, the transition determination unit 32 may transfer control of the vehicle 1 to the ECU 15 even if the humidity in the vehicle interior is not less than the fogginess determination threshold.

The transition determination unit 32 notifies the notification unit 33 and the vehicle control unit 34 of the result of determination whether to transfer control of the vehicle 1 to the ECU 15. When determining to continue driving control of the vehicle 1 that remains manual driving control, the transition determination unit 32 notifies the notification unit 33 of the reason of the determination.

When receiving from the transition determination unit 32 the result of determination that control of the vehicle 1 will not be transferred to the ECU 15, the notification unit 33 outputs to the notification device 14 notification for urging the driver to set the operating mode of the device that has caused the determination to automatic mode (hereafter "mode change notification"). Specifically, the notification unit 33 may include, in the mode change notification, a message meaning that autonomous driving control of the vehicle 1 can be started by setting the operating mode of the device to automatic mode. For example, when control of the vehicle 1 is not transferred to the ECU 15 because the operating mode of the windshield wiper 17 is set to manual mode, the notification unit 33 displays a message "Set the operating mode of the windshield wiper to automatic mode.

Autonomous driving of the vehicle 1 will be started after setting to automatic mode." on the notification device 14 or outputs the message by voice. In this way, the notification unit 33 can inform the driver that autonomous driving control of the vehicle 1 can be started by operation to change the operating mode of the notified device.

When receiving from the transition determination unit 32 the result of determination that control of the vehicle 1 will be transferred to the ECU 15, the notification unit 33 outputs to the notification device 14 notification of the start of autonomous driving control of the vehicle 1, to inform the driver that autonomous driving control will be started.

In addition, when notified by the situation determination unit 31 that autonomous driving control cannot continue, the notification unit 33 outputs to the notification device 14 notification of the end of autonomous driving control and transfer of control to the driver. The notification of the start of autonomous driving control and the notification of the end thereof are examples of control transfer notification.

After notified by the transition determination unit 32 that control of the vehicle 1 will be transferred from the driver to the ECU 15, the vehicle control unit 34 executes autonomous driving control of the vehicle 1. In addition, the vehicle control unit 34 rewrites the flag indicating the level of driving control applied to the vehicle 1, which is stored in the memory 22, to a value indicating that autonomous driving control is being applied.

For example, the vehicle control unit 34 detects lane-dividing lines demarcating a lane on which the vehicle 1 is traveling (hereafter a "host vehicle lane") and objects around the vehicle 1 (e.g., other vehicles and pedestrians) from an exterior sensor signal obtained by the vehicle exterior sensor 11. Based on the detected lane-dividing lines and moving objects, the vehicle control unit 34 sets a planned trajectory along which the vehicle 1 will travel in a section from the current position of the vehicle 1 to a predetermined distance away. The planned trajectory is set, for example, as a set of target positions of the vehicle 1 at respective times. For example, the vehicle control unit 34 sets a planned trajectory so that the vehicle 1 will not collide with the surrounding objects and will travel along the host vehicle lane. The vehicle control unit 34 controls components of the vehicle 1 so that the vehicle 1 will travel along the set planned trajectory.

In this case, the vehicle control unit 34 detects objects around the vehicle 1 and lane-dividing lines by inputting an exterior sensor signal into a classifier that has been trained to detect objects around the vehicle 1 and lane-dividing lines from an exterior sensor signal. As such a classifier, the vehicle control unit 34 can use, for example, a DNN having architecture of a CNN type, similarly to the situation determination unit 31. Such a classifier is trained in advance in accordance with a training technique, such as backpropagation, with a large number of training images representing objects or lane-dividing lines to be detected.

When notified by the situation determination unit 31 that autonomous driving control cannot continue, the vehicle control unit 34 finishes autonomous driving control after a predetermined time (e.g., several tens of seconds) from the notification. After the end of autonomous driving control, the ECU 15 controls components of the vehicle 1 according to the driver's manual driving control. In addition, the vehicle control unit 34 rewrites the flag indicating the level of driving control applied to the vehicle 1, which is stored in the memory 22, to a value indicating that manual driving control is being applied.

Figure 4:
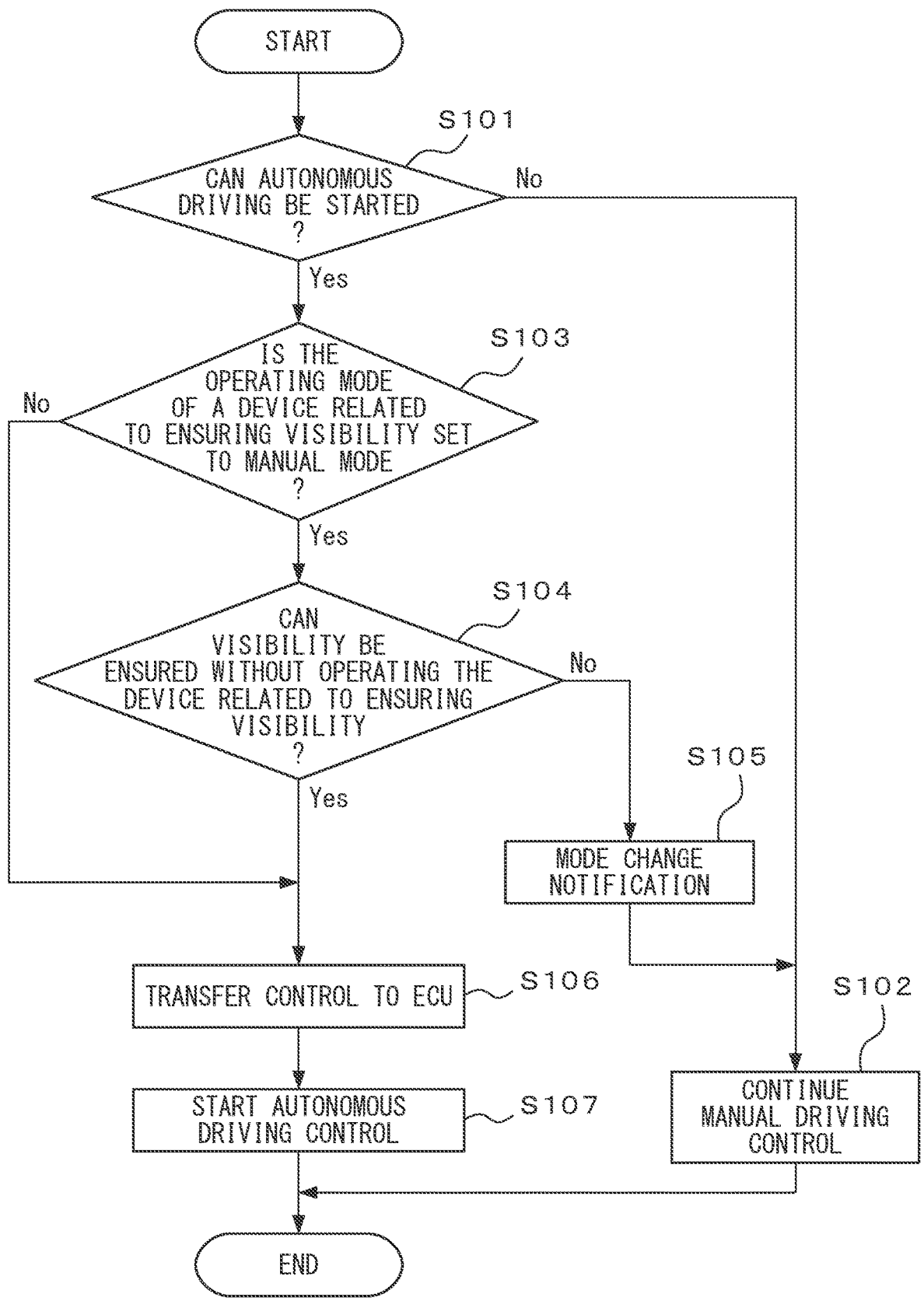
FIG. 4 is an operation flowchart of the vehicle control process.

FIG. 4 is an operation flowchart of the vehicle control process executed by the processor 23. While the vehicle 1 is under manual driving control by the driver, the processor 23 executes the vehicle control process at predetermined intervals in accordance with the operation flowchart described below.

The situation determination unit 31 of the processor 23 determines whether the vehicle 1 is in a predetermined situation that allows for starting autonomous driving control of the vehicle 1 (step S101). When it is determined that the vehicle 1 is not in the predetermined situation (No in step S101), the vehicle control unit 34 of the processor 23 continues the driver's manual driving control (step S102).

When it is determined that the vehicle 1 is in the predetermined situation (Yes in step S101), the transition determination unit 32 of the processor 23 refers to the operating mode of a device related to ensuring visibility of the driver of the vehicle 1, such as the headlights 16 or the windshield wiper 17. The transition determination unit 32 determines whether the operating mode of the device is set to manual mode (step S103). When the operating mode of the device is set to manual mode (Yes in step S103), the transition determination unit 32 determines whether the driver's visibility can be ensured without operating the device (step S104). When it is determined that the driver's visibility cannot be ensured unless the device operates (No in step S104), the notification unit 33 of the processor 23 informs the driver of mode change notification related to the device via the notification device 14 (step S105). The vehicle control unit 34 then continues the driver's manual driving control (step S102).

When the operating mode of the device related to ensuring the driver's visibility is set to automatic mode in step S103 (No in step S103), the transition determination unit 32 transfers control of the vehicle 1 from the driver to the ECU 15 (step S106). When it is determined that the driver's visibility can be ensured without operating the device in step S104 (Yes in step S104), the transition determination unit 32 also transfers control of the vehicle 1 from the driver to the ECU 15 (step S106).

After step S106, the vehicle control unit 34 starts autonomous driving control of the vehicle 1 (step S107). After step S102 or S107, the processor 23 terminates the vehicle control process.

As has been described above, the vehicle controller determines whether the vehicle under manual driving control by the driver is in a predetermined situation that allows for starting autonomous driving control of the vehicle. When the vehicle is in the predetermined situation, the vehicle controller continues control of the vehicle that remains manual driving control in the case where the operating mode of a device related to ensuring visibility of the driver of the vehicle is set to manual mode and where the driver's visibility will not be ensured unless the device operates. In this way, the vehicle controller does not start autonomous driving control in the case where the need to transfer control to the driver will arise after the start of autonomous driving control of the vehicle and where the driver's visibility may not be ensured when this need arises. Thus the vehicle controller can prevent the occurrence of a situation where the driver's visibility is not ensured, even if the need to transfer control to the driver arises during autonomous driving control of the vehicle.

According to a modified example, the transition determination unit 32 may predict a period during which autonomous driving control is applicable for the case where driving control of the vehicle 1 is switched from manual driving control to autonomous driving control (hereafter an "autonomous driving application period"). The transition determination unit 32 may then determine whether a situation where the driver's visibility is not ensured will occur at the end of the autonomous driving application period. When it is determined that such a situation will not occur, the transition determination unit 32 transfers control of the vehicle 1 from the driver to the ECU 15 even if the device related to ensuring the driver's visibility is set to manual mode when the vehicle 1 is in a predetermined situation that allows for starting autonomous driving control. Conversely, the transition determination unit 32 may predict that a situation where the driver's visibility is not ensured will occur at the end of the autonomous driving application period. In such a case, when the operating mode of the device related to ensuring the driver's visibility is set to manual mode, the transition determination unit 32 may determine to continue manual driving control even if the driver's visibility is ensured when it is determined that the vehicle 1 is in the predetermined situation.

For example, when the predetermined situation that allows for starting autonomous driving control is a situation where traffic around the vehicle 1 is congested, as described above, the transition determination unit 32 predicts the period from the current time until congestion around the vehicle 1 is relieved, as the autonomous driving application period. In this case, the transition determination unit 32 determines a predicted time until relief of traffic congestion included in traffic information received via the wireless communication device (not illustrated), as the autonomous driving application period. Alternatively, the transition determination unit 32 may determine the period obtained by dividing the distance from the current position of the vehicle 1 determined by the GPS receiver (not illustrated) to the start point of the traffic congestion indicated by the traffic information by the average speed of the vehicle 1 in the most recent predetermined period, as the autonomous driving application period.

Assume that the predetermined situation that allows for starting autonomous driving control is a situation where the current position of the vehicle 1 is within a region covered by a high-precision map and where the road being traveled by the vehicle 1 is a road of a predetermined standard. In such a case, the transition determination unit 32 determines a predicted time until the vehicle 1 reaches the outside of the region covered by the high-precision map, as the autonomous driving application period. In this case, the transition determination unit 32 determines the distance from the current position of the vehicle 1 to an outer edge of the region covered by the high-precision map along a planned travel route set by a navigation device (not illustrated). The transition determination unit 32 divides the distance by the average speed of the vehicle 1 in the most recent predetermined period to predict the autonomous driving application period.

The transition determination unit 32 determines whether a situation where the driver's visibility is not ensured will occur at the end of the predicted autonomous driving application period. For example, when the time after the autonomous driving application period from the current time is after sunset and before sunrise, the transition determination unit 32 determines that a situation where the driver's visibility is not ensured will occur. When the end time of the autonomous driving application period is after sunset and before sunrise, the transition determination unit 32 determines to continue manual driving control in the case where the headlights 16 are set to manual mode and turned off. Conversely, when the end time of the autonomous driving application period is before sunset, the transition determination unit 32 may transfer control of the vehicle 1 from the driver to the ECU 15 even if the headlights 16 are set to manual mode. Similarly, when an expected position of the vehicle 1 at the end of the autonomous driving application period is in a tunnel, the transition determination unit 32 determines that a situation where the driver's visibility is not ensured will occur at the end of the autonomous driving application period. In this case also, the transition determination unit 32 may determine to continue manual driving control in the case where the headlights 16 are set to manual mode and turned off. The transition determination unit 32 determines, for example, a position ahead of the current position of the vehicle 1 by an expected travel distance obtained by multiplying the average speed of the vehicle 1 in the most recent predetermined period by the length of the autonomous driving application period along a planned travel route of the vehicle 1, as the expected position of the vehicle 1 at the end of the autonomous driving application period.

Alternatively, when it is predicted that weather around the vehicle 1 will be rainy after the autonomous driving application period from the current time, the transition determination unit 32 may determine a situation where the driver's visibility is not ensured will occur. More specifically, when a predicted position of the vehicle 1 at the end of the autonomous driving application period is within a rainy region indicated by weather information received via the wireless communication device (not illustrated), the transition determination unit 32 determines that a situation where the driver's visibility is not ensured will occur.

In this case, the transition determination unit 32 determines to continue manual driving control, when the windshield wiper 17 is set to manual mode and set to stop operating. Conversely, when it is not predicted that weather around the vehicle 1 will be rainy at the end of the autonomous driving application period, the transition determination unit 32 may transfer control of the vehicle 1 from the driver to the ECU 15 even if the windshield wiper 17 is set to manual mode.

FIG. 5 illustrates examples of transition determination by the transition determination unit 32 according to this modified example. In FIG. 5, the abscissas represent time. Assume that at time t1, it is determined that the situation around the vehicle 1 is a predetermined situation that allows for starting autonomous driving control. In addition, assume that a period P from time t1 to time t2 is an autonomous driving application period.

In the example illustrated on the upper side of FIG. 5, it is determined that a situation where the driver's visibility is not ensured will not occur at time t2, which is a predicted end time of the autonomous driving application period P. Hence the transition determination unit 32 determines to switch driving control of the vehicle 1 from manual driving control to autonomous driving control, regardless of the operating mode of the headlights 16 and the windshield wiper 17.

In the example illustrated on the lower side of FIG. 5, it is determined that a situation where the driver's visibility is not ensured will occur at time t2, which is a predicted end time of the autonomous driving application period P. Hence, even if the driver's visibility is ensured at time t1, the transition determination unit 32 determines whether to switch driving control of the vehicle 1 from manual driving control to autonomous driving control, depending on the operating mode of the headlights 16 and the windshield wiper 17.

According to this modified example, the transition determination unit 32 can determine whether to start autonomous driving control or to continue manual driving control more appropriately when a predetermined situation occurs, and thus can improve the driver's convenience.

The computer program for achieving the functions of the processor 23 of the ECU 15 according to the embodiment or modified example may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:

1. A vehicle controller comprising:
a processor configured to:
determine whether a vehicle under manual driving control is in a situation that allows for starting autonomous driving control of the vehicle,
switch, when the vehicle is in a situation that allows for starting autonomous driving control, control of the vehicle from manual driving control to autonomous driving control when an operating mode of a device related to ensuring visibility of a driver of the vehicle is set to automatic mode to automatically control the device,
continue control of the vehicle that remains manual driving control when the operating mode of the device is set to manual mode to manually control the device and where the driver's visibility will not be ensured unless the device operates;
predict a period during which autonomous driving control is applicable for the case where control of the vehicle is switched from manual driving control to autonomous driving control,
determine whether a situation where visibility of the driver of the vehicle is not ensured will occur at the end of the period,
switch, when the situation does not occur, control of the vehicle from manual driving control to autonomous driving control even if the operating mode of the device is set to the manual mode at the time when the vehicle is in a situation that allows for starting autonomous driving control of the vehicle; and
in the case where the situation where visibility of the driver of the vehicle is not ensured will occur at the end of the period during which autonomous driving control is applicable, even if visibility of the driver of the vehicle is ensured at the time when the vehicle is in a situation that allows for starting autonomous driving control of the vehicle, the processor continues control of the vehicle that remains manual driving control in the case where the operating mode of the device is set to the manual mode to manually control the device and where the driver's visibility will not be ensured unless the device operates.

2. The vehicle controller according to claim 1, wherein the device is a windshield wiper, and the processor determines that the driver's visibility will not be ensured unless the device operates, when rainfall measured by a rainfall sensor provided on the vehicle is not less than a predetermined threshold or when the current position of the vehicle is within a rainy region indicated by weather information received from another device.

3. The vehicle controller according to claim 1, wherein the device is a headlight, and the processor determines that the driver's visibility will not be ensured unless the device operates, when illuminance measured by an illuminance sensor provided on the vehicle is not greater than a predetermined threshold or when the current time is after sunset and before sunrise.

4. The vehicle controller according to claim 1, wherein the device is an air conditioner, and the processor determines that the driver's visibility will not be ensured unless the device operates, when humidity in the interior of the vehicle measured by a humidity sensor provided on the vehicle is not less than a predetermined threshold.

5. A method for vehicle control, comprising:
determining whether a vehicle under manual driving control is in a situation that allows for starting autonomous driving control of the vehicle;
switching, when the vehicle is in a situation that allows for starting autonomous driving control, control of the vehicle from manual driving control to autonomous driving control in the case where operating mode of a device related to ensuring visibility of a driver of the vehicle is set to automatic mode to automatically control the device;
continuing control of the vehicle that remains manual driving control in the case where the operating mode of the device is set to manual mode to manually control the device and where the driver's visibility will not be ensured unless the device operates;
predicting a period during which autonomous driving control is applicable for the case where control of the vehicle is switched from manual driving control to autonomous driving control,
determining whether a situation where visibility of the driver of the vehicle is not ensured will occur at the end of the period,
switching, when the situation does not occur, control of the vehicle from manual driving control to autonomous driving control even if the operating mode of the device is set to the manual mode at the time when the vehicle is in a situation that allows for starting autonomous driving control of the vehicle; and
in the case where the situation where visibility of the driver of the vehicle is not ensured will occur at the end of the period during which autonomous driving control is applicable, even if visibility of the driver of the vehicle is ensured at the time when the vehicle is in a situation that allows for starting autonomous driving control of the vehicle, continuing control of the vehicle that remains manual driving control in the case where the operating mode of the device is set to the manual mode to manually control the device and where the driver's visibility will not be ensured unless the device operates.

6. A non-transitory recording medium that stores a computer program for vehicle control, the computer program causing a processor mounted on a vehicle to execute a process comprising:
determining whether the vehicle under manual driving control is in a situation that allows for starting autonomous driving control of the vehicle;
switching, when the vehicle is in a situation that allows for starting autonomous driving control, control of the vehicle from manual driving control to autonomous driving control in the case where operating mode of a device related to ensuring visibility of a driver of the vehicle is set to automatic mode to automatically control the device;

continuing control of the vehicle that remains manual driving control in the case where the operating mode of the device is set to manual mode to manually control the device and where the driver's visibility will not be ensured unless the device operates;

predicting a period during which autonomous driving control is applicable for the case where control of the vehicle is switched from manual driving control to autonomous driving control, determining whether a situation where visibility of the driver of the vehicle is not ensured will occur at the end of the period, switching, when the situation does not occur, control of the vehicle from manual driving control to autonomous driving control even if the operating mode of the device is set to the manual mode at the time when the vehicle is in a situation that allows for starting autonomous driving control of the vehicle; and in the case where the situation where visibility of the driver of the vehicle is not ensured will occur at the end of the period during which autonomous driving control is applicable, even if visibility of the driver of the vehicle is ensured at the time when the vehicle is in a situation that allows for starting autonomous driving control of the vehicle, continuing control of the vehicle that remains manual driving control in the case where the operating mode of the device is set to the manual mode to manually control the device and where the driver's visibility will not be ensured unless the device operates.

* * * * *